US005682090A

United States Patent [19]

Shigematsu et al.

[11] Patent Number: 5,682,090

[45] Date of Patent: Oct. 28, 1997

[54] CONTROL DEVICE FOR POWER CLOSURE

[75] Inventors: Kouichi Shigematsu; Tomoaki Monzen, both of Yokohama, Japan

[73] Assignee: Ohi Seisakusho Co., Ltd., Yokohama, Japan

[21] Appl. No.: 529,461

[22] Filed: Sep. 18, 1995

[30] Foreign Application Priority Data

Sep. 29, 1994 [JP] Japan .................................... 6-235134

[51] Int. Cl.$^6$ .......................................... B60J 1/00

[52] U.S. Cl. .......................................... 318/468; 318/470

[58] Field of Search .................................... 318/256, 261, 318/264, 265, 266, 282, 283, 286, 466, 467, 468, 469, 470

[56] References Cited

U.S. PATENT DOCUMENTS

| | | | |
|---|---|---|---|
| 4,090,113 | 5/1978 | Ogishi | 318/282 |
| 4,641,067 | 2/1987 | Iizawa et al. | 318/287 |
| 4,698,622 | 10/1987 | Goto et al. | 318/261 X |
| 4,999,551 | 3/1991 | Yoshida et al. | 318/286 |
| 5,351,439 | 10/1994 | Takeda et al. | 49/28 |

FOREIGN PATENT DOCUMENTS

| | | |
|---|---|---|
| 35 32 078 | 9/1985 | Germany . |
| 43 12 865 | 4/1993 | Germany . |

*Primary Examiner*—Bentsu Ro
*Attorney, Agent, or Firm*—Foley & Lardner

[57] ABSTRACT

A control device controls an open/close movement of an automotive window pane which is driven by an electric motor. The device comprises a first switch for, when taking ON position, energizing the motor to drive the closure in a first direction toward a pull-opened position and a second switch for, when taking ON position, energizing the motor to drive the closure in a second direction toward a full-closed position. A determining device is provided for determining an energization stopping position which is taken by the closure before taking the full-opened position when moved in the first direction. The energization stopping position and said full-opened position are separated by a given distance. A controller is further provided which stops energization of the motor when the closure comes to the energization stopping position during movement in the first direction. The given distance is a distance for which the closure can run by the force of inertia produced when energization of the motor is stopped upon reaching of the closure to the energization stopping position during movement in the first direction.

8 Claims, 8 Drawing Sheets

CONTROL DEVICE FOR POWER CLOSURE

BACKGROUND OF THE INVENTION

1. Field of the invention

The present invention relates in general to control devices for controlling operation of a power closure, and more particularly to control devices of a type which can control operation of a power mechanism of the closure.

2. Description of the Prior Art

Hitherto, for controlling operation of a power closure, various control devices have been proposed and put into practical use particularly in the field of motor vehicles. Some of them are of an automotive power window control device which controls upward and downward movements of a door window with an aid of power produced by an electric motor. That is, by energizing the electric motor to run in one or the other direction, the window pane is moved upward or downward to a desired position in a window opening of the door.

Among such power window control devices, there is a type which detects reaching of the window pane to the uppermost or lowermost position by sensing a change in strength of electric current fed to the electric motor. That is, when, for example, moved down to the lowermost position by keeping energization of the electric motor, the window pane is brought into abutment with a stopper member and thus stopped at the lowermost position. This stop action induces a locked condition of the motor and thus causes a marked increase in electric current fed to the motor. Upon sensing this marked current increase, the control device stops the energization of the motor.

However, this method for detecting arrival of the window pane at such terminal position has the following drawback.

That is, the marked current increase inevitably produced each time the window pane comes to the lowermost position (or uppermost position) applies a great load to the motor and thus lowers the durability of the motor per se and of parts of a driving mechanism driven by the motor.

SUMMARY OF THE INVENTION

It is therefore an object of the present invention to provide a control device for a power closure, which is free of the above-mentioned drawback.

According to the present invention, there is provided a control device for a power closure, wherein energization of the power closure is instantly stopped when the closure comes to a certain position just before a terminal position (or full-opened position) of the closure. The movement of the closure toward the terminal position after stopping of the energization is made by the force of inertia.

According to a first aspect of the present invention, there is provided a control device for controlling a movement of a closure which is driven by an electric motor. The control device comprises switch means for, when taking ON position, energizing the motor to drive the closure in a given direction toward a terminal position; position determining means for determining an energization stopping position which is taken by the closure before taking the terminal position when moved in the given direction, the energization stopping position and the terminal position being separated by a given distance; and power stopping means for stopping energization of the motor when the closure comes to the energization stopping position during movement in the given direction, wherein the given distance is a distance for which the closure can run by the force of inertia produced when energization of the motor is stopped upon reaching of the closure to the energization stopping position during movement in the given direction.

According to a second aspect of the present invention, there is provided a control device for controlling an open/close movement of a closure which is driven by an electric motor. The control device comprises first switch means for, when taking ON position, energizing the motor to drive the closure in a first direction toward a full-opened position; second switch means for, when taking ON position, energizing the motor to drive the closure in a second direction toward a full-closed position; position determining means for determining an energization stopping position which is taken by the closure before taking the full-opened position when moved in the first direction, the energization stopping position and the full-opened position being separated by a given distance; and control means for stopping energization of the motor when the closure comes to the energization stopping position during movement in the first direction, wherein the given distance is a distance for which the closure can run by the force of inertia produced when energization of the motor is stopped upon reaching of the closure to the energization stopping position during movement in the first direction.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In the following, the present invention will be described in detail with reference to the accompanying drawings, which is a control device applied to a power window of an automotive side door.

Figure 1:
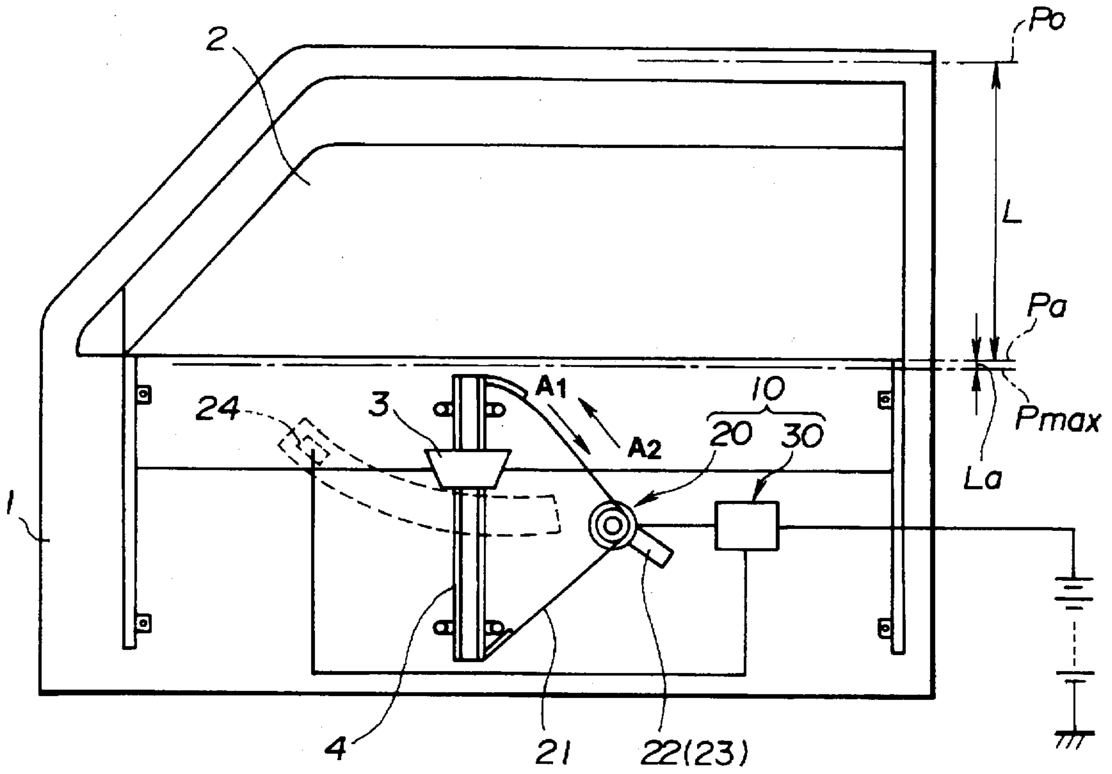
FIG. 1 is a side view of an automotive door having a power window to which the present invention is practically applied.

In FIG. 1, there is schematically shown the automotive side door 1 equipped with the power window 10. The power window 10 comprises a drive mechanism 20 which, through a carrier 3, moves up and down a window pane 2 along a guide rail 4 secured to the door 1. The carrier 3 is secured to the window pane 2 and slidably guided by the guide rail 4. The drive mechanism 20 comprises a wire 21 connected to the carrier 3, and an electric motor 22 for driving the wire 21 in one "A1" and the other "A2" directions when rotated in normal and reversed directions. That is, when the wire 21 is driven in the direction of the arrow "A1", the window pane 2 is moved upward toward a fully closed position, and when the wire 21 is driven in the direction of the arrow "A2", the window pane 2 is moved downward toward a fully opened position. The electric motor 22 is equipped with a rotation speed sensor 23 which issues a pulse signal representing the rotation speed of the motor 22. On an inside surface of the door 1, there is mounted an operation switch unit 24 which is manipulated for moving the window pane 2 upward and downward. The electric motor 22, the rotation speed sensor 23 and the operation switch unit 24 are all connected to a control device 30 through respective cables.

Figure 2:
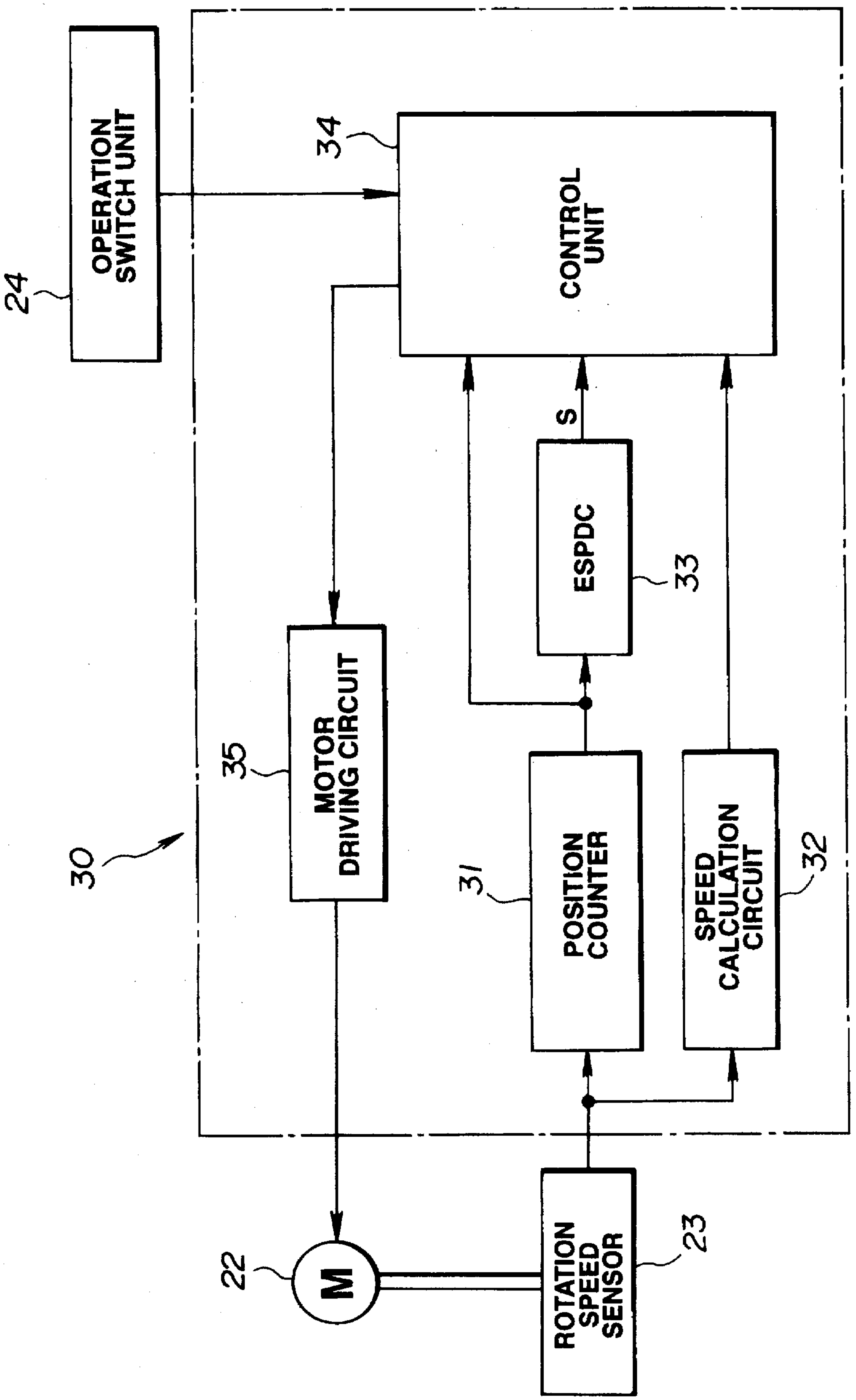
FIG. 2 is a block diagram of a control device according to the present invention.

FIG. 2 shows a block diagram of the control device 30. In the drawing, denoted by numeral 31 is a position counter which can detect the position of the window pane 2 by counting the pulse signal issued from the rotation speed sensor 23. That is, when the window pane 2 assumes its uppermost position "Po" (see FIG. 1), the position counter 31 counts "0" (zero), and as the window pane 2 is moved down, the position counter 31 counts up the pulse signal issued from the rotation speed sensor 23, and as the window pane 2 is moved up, the position counter 31 counts down the pulse signal. Accordingly, when the window pane 2 assumes its lowermost position "Pmax" (see FIG. 1), the position counter 31 indicates the maximum value. Designated by numeral 32 is a speed calculation circuit which derives the moving speed of the window pane 2 by calculating the period of the pulse signal issued from the rotation speed sensor 23.

Designated by numeral 33 is a so-called "energization stopping position detecting circuit (or ESPDC)" which, based on the window pane position information issued from the position counter 31, detects lowering of the window pane 2 to an energization stopping position "Pa" which is placed above the lowermost position "Pmax" by a given slight distance "La". The ESPDC 33 issues a detecting signal "S" when the window pane 2 is lowered to the energization stopping position "Pa". The detail of the energization stopping position "Pa" will be described hereinafter.

Outputs from the position counter 31, the speed calculating circuit 32 and the ESPDC 33 are fed to a control unit 34. By processing these outputs and a control signal from the operation switch unit 24, the control unit 34 issues an instruction signal to a motor driving circuit 35 for operating the electric motor 22 in an after-mentioned manner. Although not shown in the drawing, for operation of the electric motor 22, the motor driving circuit 35 is equipped with an UP-relay and a DOWN-relay. The operation switch unit 24 comprises manual-UP and manual-DOWN switches which are used for lifting and lowering the window pane 2 to a desired position, and auto-UP and auto-DOWN switches which are used for lifting and lowering the window pane 2 to the uppermost (viz., full closed) position and the lowermost (viz., full opened) position in a nonstop manner.

In the following, operation of the power window, which is controlled by the control device of the invention, will be described with reference to the drawings.

For ease of understanding, the description will be commenced with respect to a condition wherein the window pane 2 assumes a position as shown in FIG. 2, that is, a slightly opened position.

(1) UP-initial mode

This is an operation mode for initializing or resetting the position counter 31 by lifting the window pane 2 to the uppermost position "Po". Due to this initialization, the position counter 31 indicates "0" (zero). An UP-initial mode flag is provided until this mode is terminated.

When the manual-UP switch or the auto-UP switch of the operation switch unit 24 is manipulated, the following programmed operation steps are carried out in the control device.

Figure 3:
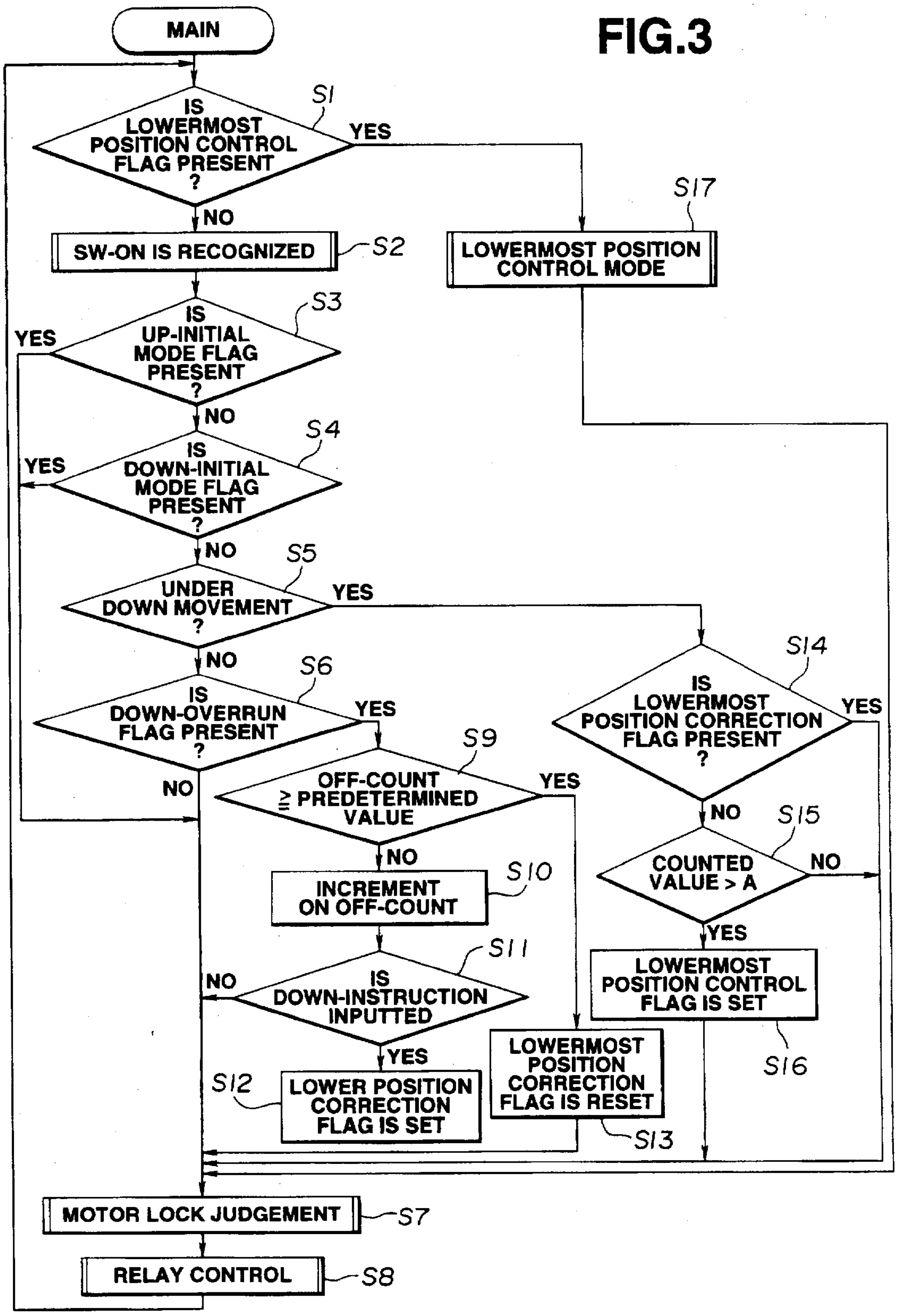
FIG. 3 is a flowchart of programmed operation steps of a main routine, which are carried out by the control device of the present invention.

In the main routine shown in FIG. 3, the operation flow goes from step S1 to step S2. At step S1, a judgment is carried out as to whether a so-called "lower position control flag" is present or not, which will be described in detail hereinafter. The step S2 is recognized since the manual-UP switch or the auto-UP switch of the operation switch unit 24 has been manipulated. Then, the operation flow goes to step S3 to judge whether the above-mentioned UP-initial mode flag is present or not. Since the UP-initial mode flag is present, the operation flow goes to step S7 to carry out a sub-routine of FIG. 4, which is a routine for making a motor lock judgment. Since, until this time, the relays of the motor driving circuit 35 have been in their OFF positions, the operation flow goes from step S21 (see FIG. 4) to step S8 (see FIG. 3) to carry out a sub-routine of FIGS. 5 and 6, which is a routine for making a relay control. Since, until this time, the window pane 2 has not made any movement yet, the operation flow goes through steps S41 and S42 to step S43 or step S44. If the auto-UP switch or the manual-UP switch of the operation switch unit 24 keeps its ON position for over a predetermined time (step S43 or step S44), the operation flow goes to step S47 to clear an OFF count, to step S48 to reset an UP-overrun flag, to step S49 to reset an UP-motor lock flag and to step S50 to make the UP-relay of the motor driving circuit 35 ON. Thus, the window pane 2 starts upward movement. The OFF count, the UP-overrun flag and the UP-motor lock flag will be described hereinafter.

Once the window pane 2 starts the upward movement, the movement is continued so long as the electric motor 22 is not locked for over a predetermined motor lock determination time (that is, so long as the window pane 2 is under an upward movement taken before a time when the window pane 2 having come to the uppermost position "Po" is locked for over the predetermined motor lock determination time (step S22, step S41)) and both an auto-UP monitoring data and a manual-UP monitoring data do not show "0" (zero) (step S55, step S56).

The auto-UP monitoring data shows "0" (zero) if one of the following two qualifications "A1" and "A2" is met, but shows "1" (one) if other qualification is met.

Qualification "A1": Qualification wherein, with the auto-UP switch assuming ON, the electric motor 22 is locked for over a predetermined motor lock determination time.

Qualification "A2": Qualification wherein the auto-UP switch is turned OFF (which includes a qualification wherein the auto-DOWN switch or the manual-DOWN switch is turned ON).

Similar to the above, the manual-UP monitoring data shows "0" (zero) if one of the following two qualifications "B1" and "B2" is met, but shows "1" (one) if other qualification is met.

Qualification "B1": Qualification wherein, with the manual-UP switch assuming ON, the electric motor 22 is locked for over a predetermined motor lock determination time.

Qualification "B2": Qualification wherein the manual-UP switch is turned OFF.

When the window pane 2 is moved up to the uppermost position "Po" and locked for over a predetermined motor lock determination time (step S22, see FIG. 4), the operation flow goes to step S23. At this step, the counted value for measuring the motor lock keeping time (viz., the time for which the motor is kept locked) is cleared. Then, the operation flow goes through step S24 and step S25 to step S26 to reset the UP-initial mode flag and then to step S27 to reset the counted value of the position counter 31 to "0" (zero). Then, if the upward movement of the window pane 2 has been caused by the auto-UP switch (step S28), the auto-UP switch is reset (step S29) and then the UP-motor lock flag is set (step S30). Accordingly, the UP-motor lock flag is set when the window pane 2 is kept locked at the uppermost position "Po".

Figure 5:
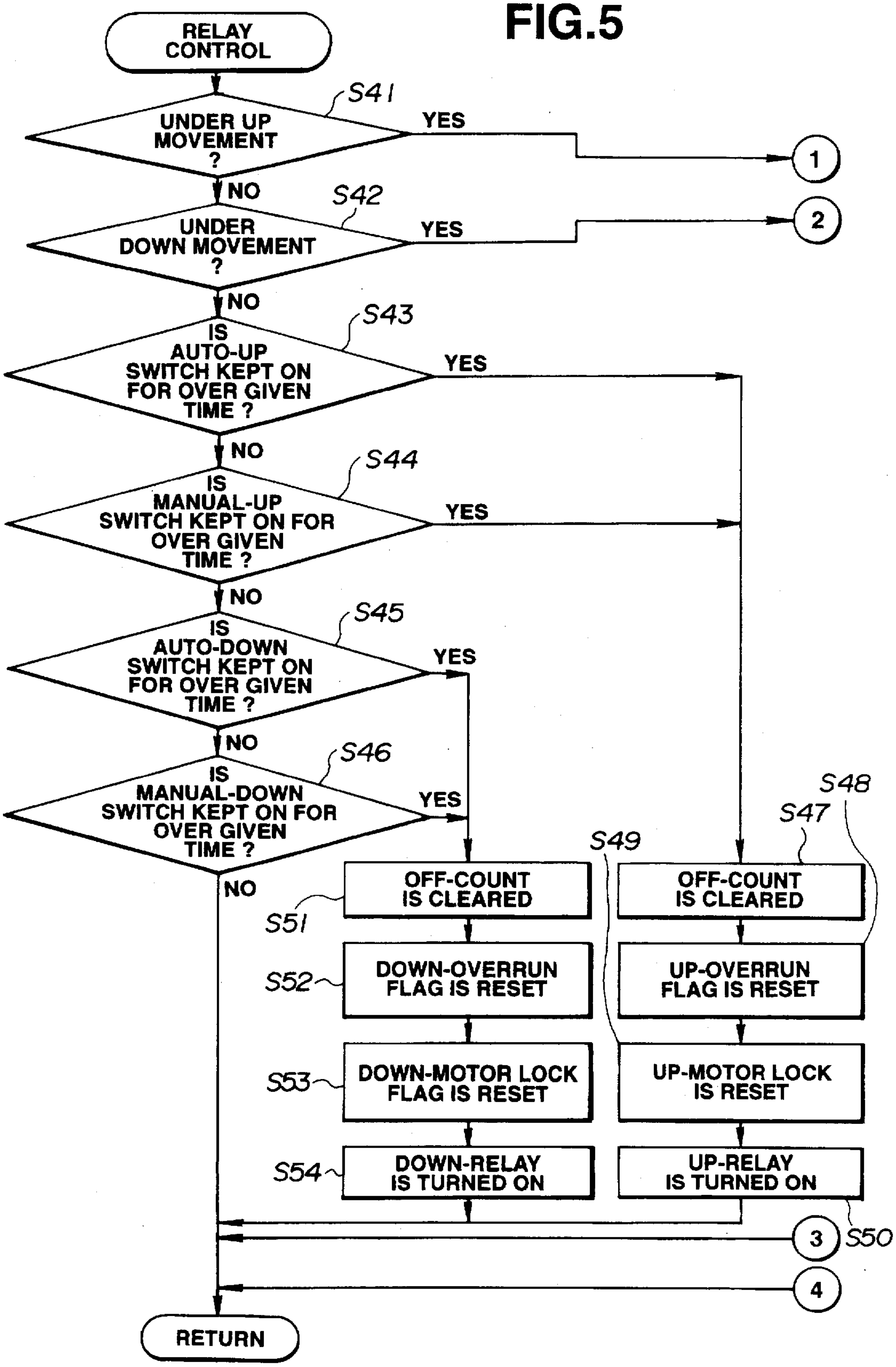
FIGS. 5 and 6 show a flowchart of programmed operation steps of a subroutine, which are carried out by the control device for controlling operation of a relay.
Figure 6:
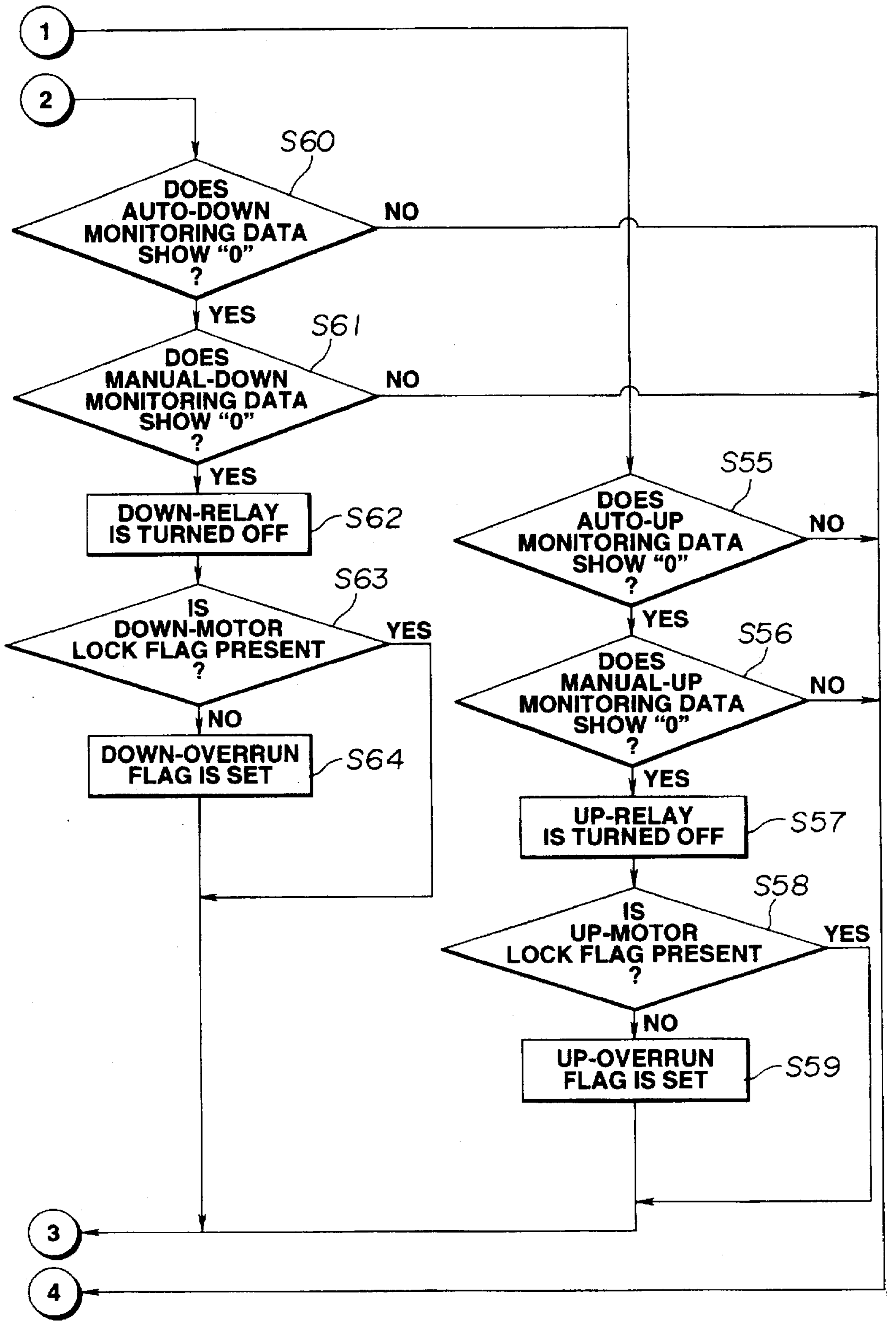

Thereafter, in the subroutine of FIGS. 5 and 6 for the relay control, the operation flow goes through step S41 to step S57 (see FIG. 6) in case that both the auto-UP monitoring data and the manual-UP monitoring data show "0" (zero) (step S55 and step S56). At this step (step S57), the UP-relay of the motor driving circuit 35 is turned OFF to stop the upward movement of the window pane 2. Then, if the UP-motor lock flag is not present (step S58), the UP-overrun flag is set (step S59). Accordingly, the UP-overrun flag is set before the UP-motor lock flag is set, that is, when the upward movement of the window pane 2 stops before the window pane 2 is locked at the uppermost position.

In the above-mentioned manner, the counted value of the position counter 31 is reset to "0" (zero) .

(2) DOWN-initial mode

This is an operation mode for determining the value which should be counted by the position counter 31 when, after the counted value of the position counter 31 has been reset to "0" (zero) by carrying out the above-mentioned UP-initial mode, the window pane 2 is lowered to the lowermost position "Pmax". A DOWN-initial mode flag is provided until this operation mode is terminated.

When the manual-DOWN switch or the auto-DOWN switch of the operation switch unit 24 is manipulated, the following programmed operation steps are carried out in the control device.

In the main routine shown in FIG. 3, the operation flow goes from step S1 to step S2. The step S2 is recognized since the manual-UP switch or the auto-UP switch of the operation switch unit 24 has been manipulated. Then, the operation flow goes through step S3 to step S4 to judge whether the above-mentioned DOWN-initial mode flag is present or not. Since the DOWN-initial mode flag is present, the operation flow goes to step S7 to carry out the motor lock judgment sub-routine of FIG. 4. Since, until this time, the relays of the motor driving circuit 35 have been in their OFF positions, the operation flow goes from step S21 (see FIG. 4) to step S8 (see FIG. 3) to carry out the relay control sub-routine of FIGS. 5 and 6. Since, until this time, the window plane has not made any movement yet, the operation flow goes through steps S41, S42, S43 and S44 to step S4S or through steps S41, S42, S43, S44 and S45 to S46. If the auto-DOWN switch or the manual-DOWN switch of the operation switch unit 24 keeps its ON position for over a predetermined time (step S45 or step S46), the operation flow goes to step S51 to clear an OFF count, to step S52 to reset a DOWN-overrun flag, to step S53 to reset a DOWN-motor lock flag and to step S54 to make the DOWN-relay of the motor driving circuit 35 ON. Thus, the window pane 2 starts downward movement. The OFF count, the DOWN-overrun flag and DOWN-motor lock flag will be described hereinafter.

Once the window pane 2 starts the downward movement, the movement is continued so long as the electric motor 22 is not locked for over a predetermined motor lock determination time (that is, so long as the window pane 2 is under a downward movement taken before a time when the window pane 2 having come to the lowermost position "Pmax" is locked for over the predetermined motor lock determination time (steps S22 and S42) and both an auto-DOWN monitoring data and a manual-DOWN monitoring data do not show "0" (zero) (step S60, step S61).

The auto-DOWN monitoring data shows "0" (zero) if one of the following two qualifications "C1" and "C2" is met, but shows "1" (one) if other qualification is met.

Qualification "C1": Qualification wherein, with the auto-DOWN switch assuming ON, the electric motor 22 is locked for over a predetermined motor lock determination time.

Qualification "C2": Qualification wherein the auto-DOWN switch Rs turned OFF (which includes a qualification wherein the auto-UP switch or the manual-UP switch is turned ON).

Similar to the above, the manual-DOWN monitoring data shows "0" (zero) if one of the following two qualifications "Di" and "D2" is met, but shows "1" (one) if other qualification is met.

Qualification "D1": Qualification wherein, with the manual-DOWN switch assuming ON, the electric motor 22 is locked for over a predetermined motor lock determination time.

Qualification "D2": Qualification wherein the manual-DOWN switch is turned OFF.

When the window pane 2 is moved down to the lowermost position "Pmax" and locked for over a predetermined motor lock determination time (step S22, see FIG. 4), the operation flow goes to step S23. At this step, the counted value for measuring the motor lock keeping time (viz., the time for which the motor is kept locked) is cleared. Then, the operation flow goes through steps S24 and S31 to step S32 to reset the DOWN-initial mode flag and then to step S33 to store the current value of the position counter 31 as a lowermost position representing value which should be counted by the position counter 31 when the window pane 2 is lowered to the lowermost position "Pmax". Then, at step S34, an after-mentioned lowermost position correction flag is reset. Then, if the downward movement of the window pane 21 has been caused by the auto-DOWN switch (step S35), the auto-DOWN switch is reset (step S36) and then the DOWN-motor lock flag is set (step S37). Accordingly, the DOWN-motor lock flag is set when the window pane 2 is kept locked at the lowermost position "Pmax"

Thereafter, in the subroutine of FIGS. 5 and 6 for the relay control, the operation flow goes through step S42 to step S62 (see FIG. 6) in case that both the auto-DOWN monitoring data and the manual-DOWN monitoring data show "0" (zero) (steps S60 and S61). At this step S62, the DOWN-relay is turned OFF to stop the downward movement of the window pane 2. Then, if the DOWN-motor lock flag is not present (step S63), the DOWN-overrun flag is set (set S64). Accordingly, the DOWN-overrun flag is set before the DOWN-motor lock flag is set, that is, when the downward movement of the window pane 2 stops before the window pane 2 is locked at the lowermost position.

In the above-mentioned manner, the value to be counted by the position counter 31 when the window pane 2 takes the lowermost position "Pmax" is determined.

Figure 8:
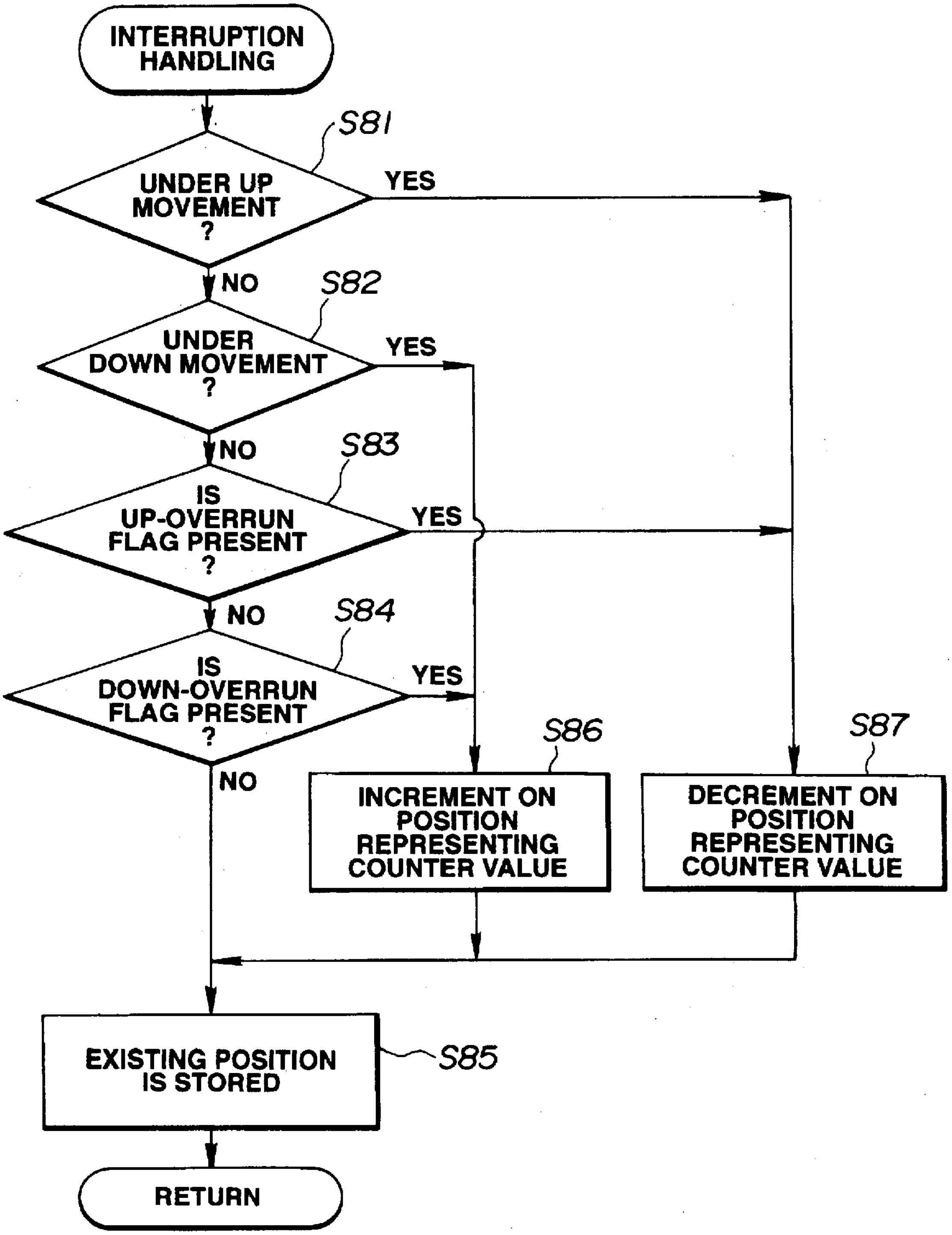
FIG. 8 is a flowchart of programmed operation steps executed by the control device for carrying out an interruption handling routine.

The value counted by the position counter 31 is subjected to increment or decrement by means of an interruption handling routine of FIG. 8. That is, when the window pane 2 is under the upward movement (step S81) or under an after-mentioned UP-overrun movement (step S83), the value of the position counter 31 is counted down each time the rotation speed sensor 23 issues a pulse signal (step S87). Furthermore, when the window pane 2 is under the downward movement (step S82) or under an after-mentioned DOWN-overrun movement (step S84), the value of the position counter 31 is counted up each time the sensor 23 issues the pulse signal (step S86). The value thus counted down or up is stored as a data for representing the existing position of the window pane 2 (step S85).

(3) Down movement made between the uppermost position "Po" and the energization stopping position "Pa"

After the above-mentioned UP-initial mode and DOWN-initial mode are practically executed, the window pane 2 is moved downward in response to ON operation of either one of the manual-DOWN switch and the auto-DOWN switch of the operation switch unit 24.

Upon ON-operation of such Down-switch, in the main routine of FIG. 3, the operation flow goes from step S1 to step S2. The step S2 is recognized since the manual-DOWN switch or auto-DOWN switch has been turned ON. Until this time, the window pane 2 has not made any downward movement. Thus, subject to presence of a DOWN-overrun flag (step S6)(that is, in case that the window pane 2 is not locked at the lowermost position "Pmax"), the operation flow goes through steps S3, S4, S5 and S6 to step S9 to judge whether or not a given time has passed from the time when a previous turning-OFF of the DOWN-relay was made. The passing time is counted by an OFF time counter. If such given time has not passed, an after-mentioned lowermost position correction flag is reset (step S13). The OFF count value is subjected to increment or increased until a DOWN-information produced by ON operation of the DOWN-switch is practically inputted (steps S10 and S11). If such given time has passed at step S9, the operation step goes to step S13 to reset the lowermost position correction flag.

Figure 4:
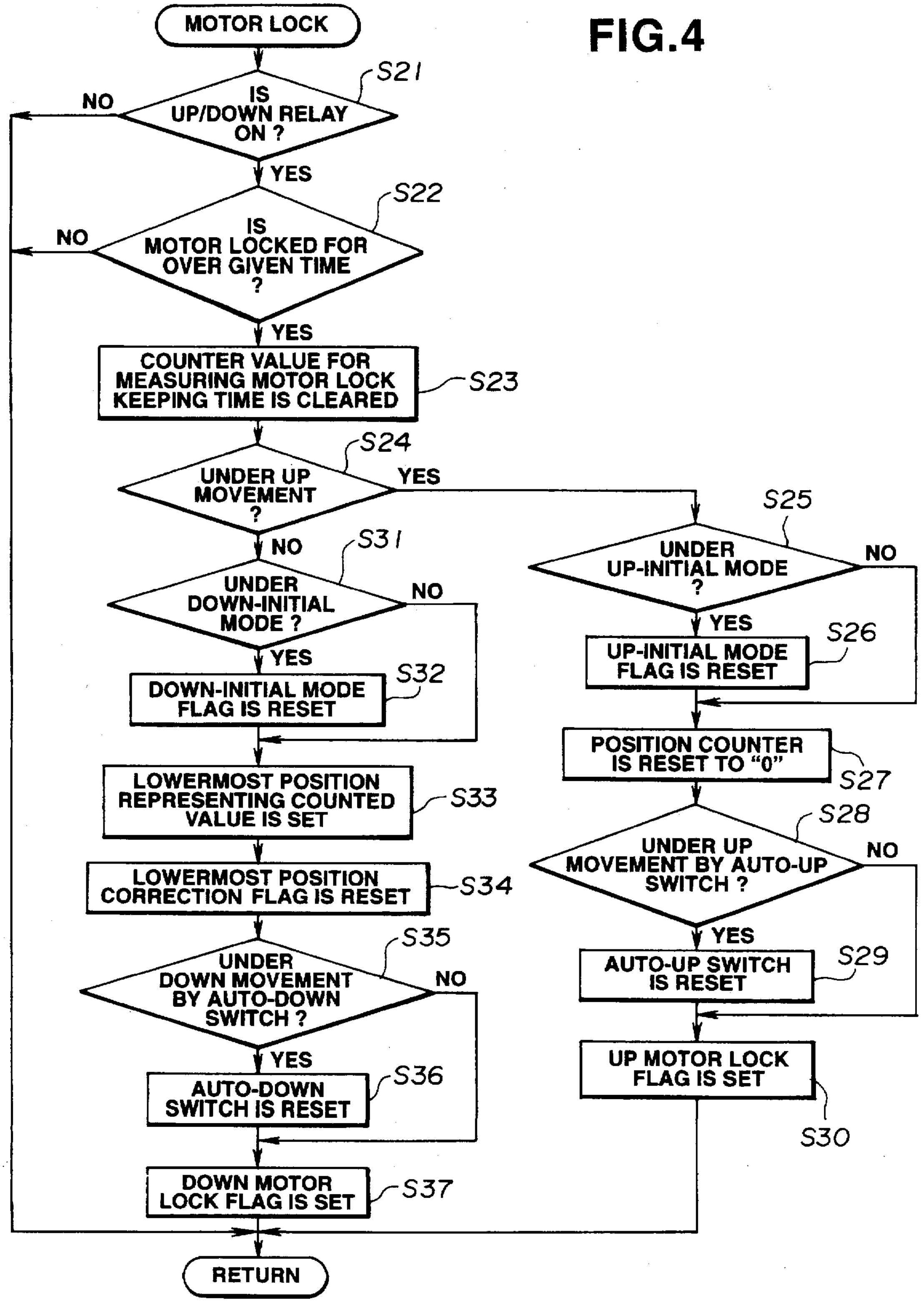
FIG. 4 is a flowchart of programmed operation steps of a subroutine, which are carried out by the control device for judging whether an electric motor has been locked or not.

Thereafter, the steps S7 and S8, that is, the motor lock judgment subroutine of FIG. 4 and the relay control subroutine of FIGS. 5 and 6 are executed. That is, through steps S21, S22, S41, S42, S43, S44, S45 and S51, S52, S53 and S54 or through steps S21, S22, S41, S42, S43, S44, S45, S46 and S51, S52, S53, S54 and S54, the downward movement of the window pane 2 starts. When this downward movement starts, the operation flow goes from step S5 of the main routine of FIG. 3 to step S14 to judge whether the lower position correction flag is present or not. Since, under this condition, the lower position correction flag is not present, the operation flow goes to step S15. At this step S15, a judgment is carried out as to whether or not the counted value of the position counter 31 exceeds a given value "A" which represents the energization stopping position "Pa". This judgment is effected by the position counter 31 shown in FIG. 2.

The energization stopping position "Pa" is so determined that when the energization of the motor 22 is stopped upon arrival of the downward moving window pane 2 at the position "Pa", the window pane 2 can assuredly move to the lowermost position "Pmax" by the force of inertia. That is, when the downward moving window pane 2 goes beyond the position "Pa", the value counted by the position counter 31 exceeds the given value "A". It is to be noted that the given value "A" corresponds to a value provided by subtracting the counted value representing the distance "la" (see FIG. 1) from the counted value (viz., lowermost position representing counted value) representing the lowermost position "Pmax".

When, under the downward movement of the window pane 2 with the counted value being smaller than the given value "A", the auto-DOWN switch or manual-DOWN switch is turned OFF and the auto-DOWN-monitoring data or the manual-DOWN monitoring data shows "1" (one), the DOWN-relay of the motor driving circuit 35 is turned OFF at step S62 of the relay control subroutine of FIGS. 5 and 6. Thus, the downward movement of the window pane 2 is stopped.

(4) Downward movement exceeding the energization stopping position "Pa"

(4)-1

Figure 7:
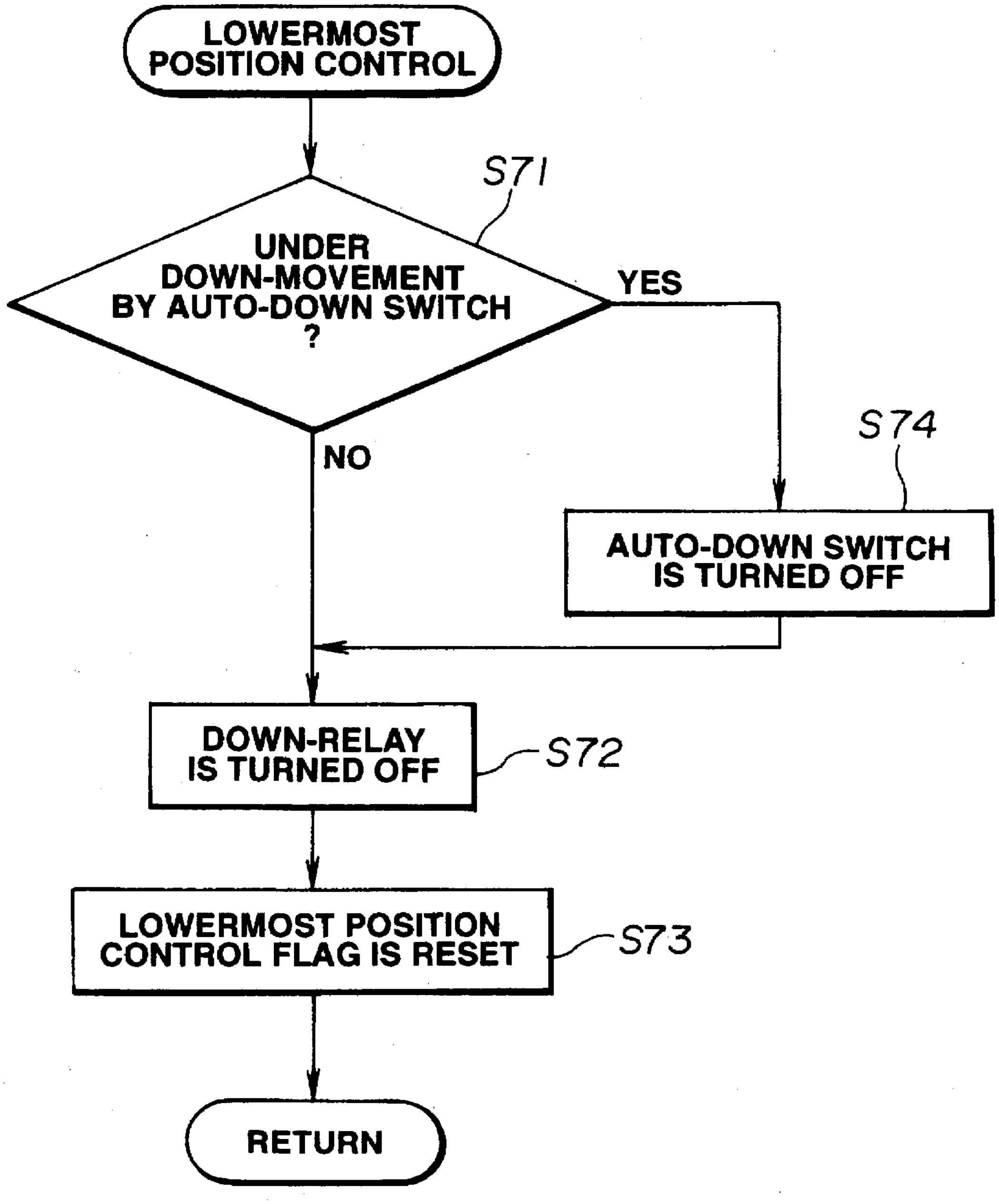
FIG. 7 is a flowchart of programmed operation steps of a subroutine, which are carried out by the control device for controlling a lowermost positioning of the window.

When, due to continuous downward movement of the window pane 2, the counted value of the position counter 31 exceeds the given value "A", the energization stopping position detecting circuit (SSPDC) 33 (see FIG. 2) issues a detecting signal "S". With this, the operation flow goes from step S15 to step S16 of the main routine of FIG. 3. At step S16, a lower position control flag is set. Thus, thereafter, the operation flow goes from step S1 to step S17 to execute the subroutine of FIG. 7 through which a lower position control mode is carried out.

That is, when the window pane 2 is under the auto-DOWN movement induced by ON operation of the auto-DOWN switch (step S71), stopping of energization of the motor 22 is effected by turning OFF the auto-DOWN switch (step S74) and then turning OFF the DOWN-relay (step S72). While, when the window pane 2 is under the manual-DOWN movement induced by ON operation of the manual-DOWN switch, stopping of energization of the motor 22 is effected by only turning OFF the DOWN-relay (S-72), as shown. Then, at step S73, the lower position control flag is reset.

As is described hereinabove, when the window pane 2 is moved down to the energization stopping position "Pa" which is slightly above the lowermost position "Pmax", the DOWN-relay is automatically turned OFF to stop energization of the electric motor 22. Thereafter, the window pane 2 moves down to the lowermost position "Pmax" by only the force of inertia. Thus, in comparison with the above-mentioned conventional control device wherein energization of the motor is continued until the window pane comes to the lowermost position, the control device of the present invention can provide the motor and parts of the driving mechanism with a higher durability.

(4)-2

If, after the window pane 2 moves down from the energization stopping position "Pa" by the inertia force, a DOWN-instruction is issued from the auto-DOWN switch or the manual-DOWN switch within a predetermined time determined by the OFF-counter, the following correction operation is carried out. That is, in such case, the control device judges that, due to deformation of parts of the drive mechanism 20 caused by long-time usage, the window pane 2 has failed to reach the lowermost position "Pmax".

The correction operation is as follows.

That is, at an initial stage of the downward movement of the window pane 2, the operation flow goes from step S9 to step S10 (see FIG. 3) to effect increment on the counted value of the OFF time counter, that is, to increase the OFF-count value. Then, if a DOWN-instruction caused by ON operation of the auto-DOWN switch or the manual-DOWN switch (step S11) is inputted, the lower position correction flag is set (step S12).

Due to presence of the lower position correction flag thus set, the downward movement of the window pane 2 is continued without effecting the judgment as to whether the window pane 2 has passed through the energization stopping position "Pa" or not, that is, whether the counted value exceeds the value "A" or not. The downward movement of the window pane 2 is stopped when the auto-DOWN switch or the manual-DOWN switch is turned OFF, or when the window pane 2 is brought to the lowermost position "Pmax" and locked there.

When the window pane 2 is kept locked at the lowermost position "Pmax" for over a predetermined motor lock determination time, the operation flow goes to steps S22, S23, S24, S31 and S33. At this step S33, the value counted by the position counter 31 is set as an updated value which represents the lowermost position "Pmax". Then, the operation flow goes to step S34 to reset the lower position correction flag. Accordingly, once the lower position representing counted value of the position counter 31 is updated, a value provided by subtracting the counted value representing the distance "La" (see FIG. 1) from the updated counted value is set as a corrected value for the value "A". Accordingly, thereafter, the desired matter wherein the window pane 2 fails to reach the lowermost position "Pmax" can be avoided. That is, the value "A" is automatically corrected once a DOWN-instruction is issued from the auto-DOWN switch or the manual-DOWN switch within the predetermined time, for avoiding the undesired matter.

(5) UP-movement

After the above-mentioned UP-initial mode and DOWN-initial mode are practically executed, the window pane 2 is moved upward in response to ON operation of either one of the manual-UP switch and the auto-UP switch of the operation switch unit 24.

Upon ON-operation of such Up-switch, in the main routine of FIG. 3, the operation flow goes from step S1 to step S2. The step S2 is recognized since the manual-UP switch of the auto-UP switch has been turned ON. Until this time, the window pane 2 has not made any upward movement. Thus, the operation flow goes to steps S3, S4, S5 and S6 and goes to step S7 for carrying out the motor lock judgment subroutine of FIG. 4 and to step S8 for carrying out the relay control subroutine of FIGS. 5 and 6. Then, through steps S21, S22, S41, S42, S43, S47, S48, S49 and S50 or through steps S21, S22, S41, S42, S43, S44, S47, S48, S49 and S50, the upward movement of the window pane 2 starts. The upward movement of the window pane 2 is stopped when, due to OFF turning of the auto-DOWN switch or the manual-DOWN switch, the auto-DOWN monitoring date or the manual-DOWNmonitoring data shows "1" (one), or when the window pane 2 is moved up to the uppermost position "Po".

When, the window pane 2 is moved up the uppermost position "Po" and the motor 22 is locked for over a predetermined motor lock determination time, the position counter 31 is reset to "0" (zero) (step S27), like in the case of the above-mentioned UP-initial mode. That is, each time the window pane 2 takes the full-closed position, the position counter 31 is reset to make a suitable correction to the value counted by the position counter 31 with respect to the uppermost position "Po", so that deterioration in accuracy for detecting the position of the upward moving window pane 2, which would be caused by a long-time usage of the window pane 2, can be avoided.

Although the above description is directed to a control system wherein when the window pane is moved down to the energization stopping position which is just above the lowermost position, energization of the motor is stopped, the control system may be so constructed that when the window pane is moved up to an energization stopping position which is just below the uppermost position, energization of the motor is stopped. Of course, also in this case, the energization stopping position should be determined by considering an inertia movement of the window pane which is expected after stopping the energization.

As will be understood from the foregoing description, in the control device according to the present invention, energization of the electric motor is stopped when the closure is moved to a predetermined position just before the terminal position of the closure, and a subsequent movement of the closure from the predetermined position to the terminal position is effected by the force of inertia. Accordingly, in comparison with the above-mentioned conventional control device wherein energization of the motor is continued until the closure comes to the terminal position, the control device of the present invention can provide the motor and other parts driven by the motor with a higher durability.

Although the above description is directed to a power window including a vertically movable window pane, the concept of the present invention is easily applicable to other power closures, such as slide door, hinged door, slidable sun roof, tiltable sun roof and the like.

What is claimed is:

1. A control device for controlling a movement of a closure which is driven by an electric motor, comprising:

switch means for, when taking an ON position, energizing said motor to drive said closure in a given direction toward a terminal position;

position determining means for determining an energization stopping position which is taken by said closure before taking said terminal position when moved in said given direction, said energization stopping position and said terminal position being separated by a given distance; and power stopping means for stopping energization of said motor when said closure comes to said energization stopping position during movement in said given direction, wherein said given distance is a distance for which said closure can run by the force of inertia produced when energization of the motor is stopped upon reacting of said closure to said energization stopping position during movement in said given direction, and wherein said position determining means comprises a first means for determining a reference position when said closure is brought to said terminal position and a second means for determining said energization stopping position in accordance with a moved distance of said closure from said reference position.

2. A control device for controlling an open/close movement of a closure which is driven by an electric motor, comprising:

first switch means for, when taking an ON position, energizing said motor to drive said closure in a first direction toward a fully-opened position;

second switch means for, when taking an ON position, energizing said motor to drive said closure in a second direction toward a fully-closed position;

position determining means for determining an energization stopping position which is taken by said closure before taking said fully-opened position when moved in said first direction, said energization stopping position and said fully-opened position being separated by a given distance; and control means for stopping energization of said motor when said closure comes to said energization stopping position during movement in said first direction, wherein said given distance is a distance for which said closure can run by the force of inertia produced when energization of the motor is stopped upon reaching of said closure to said energization stopping position during movement in said first direction, and wherein said position determining means comprises a first means for determining a reference position when said closure is brought to said fully-closed position and a second means for determining said energization stopping position in accordance with a moved distance of said closure from said reference position.

3. A control device as claimed in claim 2, in which said second means includes a position counter which, each time said closure comes to said fully-closed position, carries out a reset thereof to correct said reference position.

4. A control device as claimed in claim 2, in which said control means energizes said motor to drive said closure toward said fully-opened position when said first switch means is turned ON within a given time from the time when the energization of the motor was stopped due to reaching of said closure to said energization stopping position.

5. A control device as claimed in claim 2, in which said position determining means further comprises:

a rotation speed sensor issuing a pulse signal representing the rotation speed of said electric motor; and a position counter which detects the position of said closure by counting the pulse signal issued from said rotation speed sensor.

6. A control device as claimed in claim 5, in which said control means includes an energization stopping position detecting circuit which issues a detecting signal when said closure is lowered to said energization stopping position.

7. A control device as claimed in claim 2, in which said closure is a window pane which is moved upward to the fully-closed position and downward to the fully-opened position.

8. A control device for controlling an open/close movement of a closure which is driven by an electric motor, comprising:

a first switch for energizing said motor to drive said closure in a first direction toward a fully-opened position;

a second switch for energizing said motor to drive said closure in a second direction toward a fully-closed position, and a controller for stopping energization of said motor when said closure comes to an energization stopping position during movement in said first direction toward said fully-opened position, wherein said energization stopping position and said fully-opened position is separated by a distance sufficient to offset a movement of said closure caused by initial forces when the energization of said motor is stopped during the movement of the closure in said first direction, and wherein said controller determines said energization stopping position by determining a reference position when said closure is brought to said fully-closed position and in accordance with a moved distance of said closure from said reference position.

* * * * *